(12) United States Patent
Hulse et al.

(10) Patent No.: US 6,510,267 B1
(45) Date of Patent: Jan. 21, 2003

(54) OPTICAL WAVEGUIDE CONNECTORS

(75) Inventors: George R. Hulse, Cookeville, TN (US); Joe Parton Young, Sparta, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/258,143

(22) Filed: Feb. 26, 1999

(51) Int. Cl.$^7$ .............................. G02B 6/26; G02B 6/38
(52) U.S. Cl. ............................ 385/50; 385/25; 385/31; 385/39; 385/47; 385/58; 385/66
(58) Field of Search ..................... 385/50, 25, 55–58, 385/63, 65, 66, 132, 137, 73, 18, 39, 133.31, 146, 41, 47, 52; 362/301, 581, 558

(56) References Cited

U.S. PATENT DOCUMENTS

| | | | |
|---|---|---|---|
| 3,832,028 A | 8/1974 | Kapron | |
| 3,901,581 A | 8/1975 | Thiel | |
| 3,990,779 A | 11/1976 | McCartney | |
| 4,021,099 A | 5/1977 | Kawaski et al. | |
| 4,103,154 A | * 7/1978 | d'Auria et al. | 250/227 |
| 4,186,997 A | * 2/1980 | Schumacher | 385/65 |
| 4,201,444 A | * 5/1980 | McCartney et al. | 385/64 |
| 4,203,650 A | 5/1980 | Millet et al. | |
| 4,423,922 A | * 1/1984 | Porter | 385/42 |
| 4,639,074 A | 1/1987 | Murphy | |
| 4,730,883 A | 3/1988 | Mori | |
| 4,744,627 A | 5/1988 | Chande et al. | |
| 4,772,087 A | * 9/1988 | Ito | 385/137 |
| 4,826,273 A | 5/1989 | Tinder et al. | |
| 5,046,805 A | 9/1991 | Simon | |
| RE33,722 E | 10/1991 | Scifres et al. | |
| 5,170,448 A | 12/1992 | Ackley et al. | |
| 5,257,331 A | * 10/1993 | Shapir | 385/25 |
| 5,357,592 A | 10/1994 | Neilson | |
| 5,404,417 A | 4/1995 | Johnson et al. | |
| 5,416,669 A | 5/1995 | Kato et al. | |
| 5,535,295 A | 7/1996 | Matsumoto | |
| 5,555,331 A | * 9/1996 | Billet et al. | 385/49 |
| 5,671,316 A | 9/1997 | Yuhara et al. | |
| 5,755,505 A | 5/1998 | Hiramatsu | |
| 5,909,525 A | * 6/1999 | Millter et al. | 385/73 |
| 6,139,176 A | * 10/2000 | Hulse et al. | 362/581 |

OTHER PUBLICATIONS

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

* cited by examiner

*Primary Examiner*—John D. Lee
*Assistant Examiner*—Juliana K. Kang
(74) *Attorney, Agent, or Firm*—Reising, Ethington, Barnes, Kisselle, Learman & McCulloch, P.C.

(57) ABSTRACT

An optical waveguide connector (100) includes a first component (130) defining a first channel portion (145) formed along a length of an inner surface thereof. The first channel portion (145) is sized to receive a waveguide (120). A second component (135) defines a second channel portion (145) along a length of an inner surface thereof. The second channel portion (145) also is sized to receive a waveguide (120). A fastening mechanism fastens the first component (130) to the second component (135) such that the waveguides (120) are held in position. The first and second channel portions form a channel (145) having a reflective inner surface (150) and a central portion (167). The central portion (167) surrounds and conforms in shape to the waveguides (120).

23 Claims, 5 Drawing Sheets

OPTICAL WAVEGUIDE CONNECTORS

BACKGROUND OF THE INVENTION

The invention relates to connectors for joining optical waveguides. In general, optical waveguides are solid conduits formed of light-transmitting material, such as glass, acrylic or plastic. A distributed lighting system may use optical waveguides to distribute light from one or more light sources in central locations to one or more remote locations. Such a system may employ optical waveguide connectors for joining optical waveguide sections.

SUMMARY OF THE INVENTION

An optical waveguide connector includes a first component defining a first channel portion formed along a length of an inner surface thereof. The first channel portion is sized to receive a waveguide. A second component defines a second channel portion along a length of an inner surface thereof. The second channel portion also is sized to receive a waveguide. A fastening mechanism fastens the first component to the second component such that the waveguides are held in position. The first and second channel portions form a channel having a reflective inner surface and a central portion. The central portion surrounds and conforms in shape to the waveguides.

An integrated optical waveguide connector includes first and second waveguides. The second waveguide has a plug integrally formed at an end thereof. The plug has a hollow portion sized to receive the end of the first waveguide.

Other features and advantages of the invention will be apparent from the following description, including the drawings, and from the claims.

DESCRIPTION OF THE PREFERRED EMBODIMENTS

Figure 1:
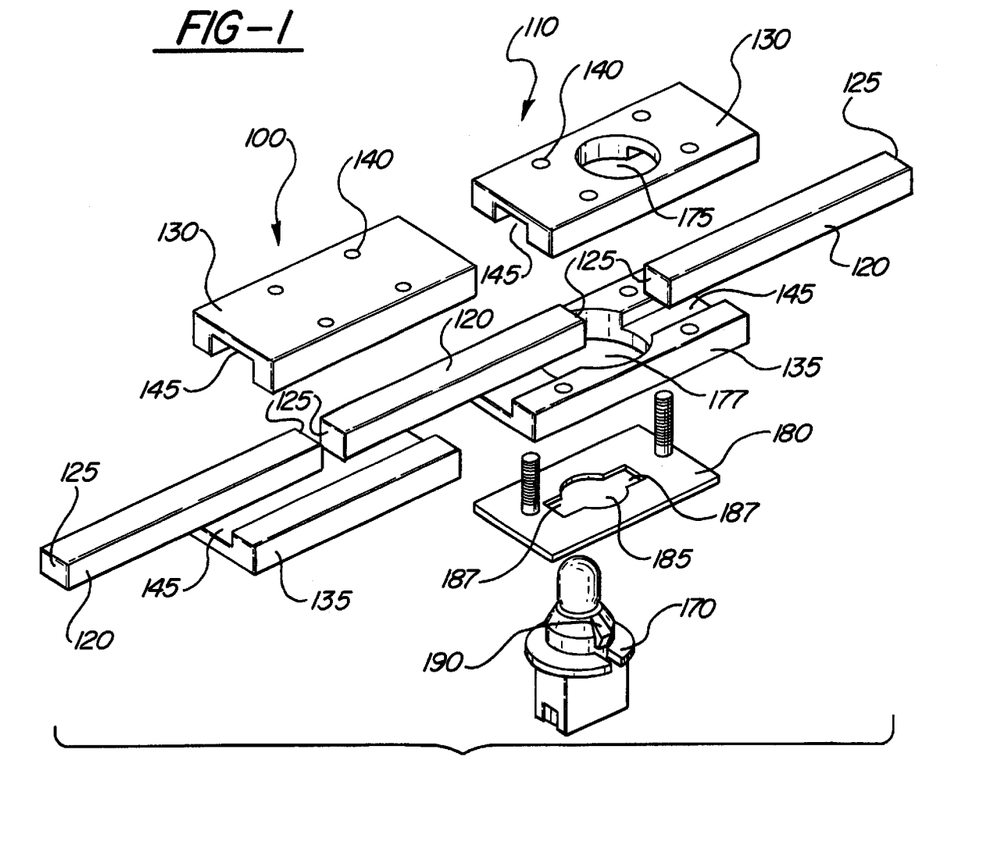
FIG. 1 is an exploded view of a waveguide connector and a waveguide illuminator.

FIG. 1 shows connectors 100 and 110 that join optical waveguides 120. The optical waveguides 120 are solid conduits formed of light-transmitting material, such as glass, acrylic or plastic. Light enters an input face 125 of an optical waveguide 120 and is internally reflected at the surfaces of the optical waveguide 120, i.e., the interface between the solid material and the surrounding air. The internal reflection occurs along the length of the optical waveguide 120 and tends to keep light contained within the optical waveguide. Waveguides are relatively inexpensive and may be manufactured using injection molding.

Each waveguide connector 100 and 110 has a top component 130 and a bottom component 135. Typically, these components are formed of metal, and are fastened together with nuts and bolts, screws or other hardware inserted into fastening holes 140. Alternatively, the components may be formed of plastic. The waveguide sections 120 fit within grooves or channels 145 on the inside surfaces of the top and bottom components 130 and 135. The waveguide sections 120 are held in position, in part, by pressure applied by the top and bottom components 130 and 135. The connectors 100 and 110 may be used, for example, in a light distribution system to connect separate portions or subassemblies of the system.

Figure 2:
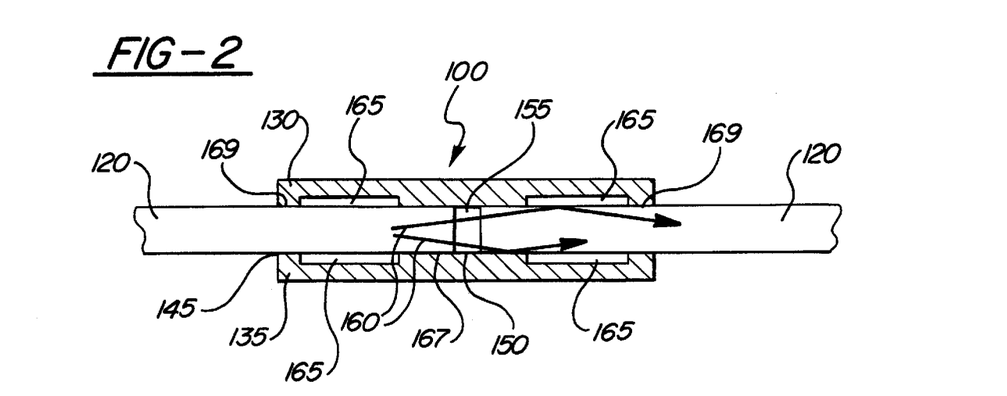
FIGS. 2 and 3 are sectional views of waveguide connectors.
Figure 3:
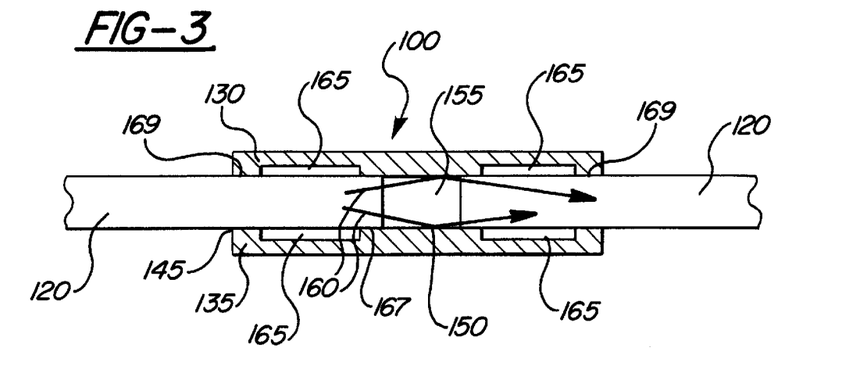

As shown in the sectional views of FIGS. 2 and 3, the channels 145 in which the waveguides 120 are positioned run along the length of the top and bottom components 130 and 135. The inner surface 150 of a channel 145 is made to be reflective through polishing or other means, such as reflective tape, or a reflective aluminum coating. In addition, the components may be made of reflective, colored plastic (e.g., white plastic), which forms a reflective channel 145 without requiring further manufacturing steps.

A gap 155 may be formed between the ends of the waveguides 120, and may vary in length. This allows flexibility in the positioning of lighting system components. For relatively small gaps 155, as shown in FIG. 2, most of the light 160 output by the first waveguide passes directly into the second waveguide. For larger gaps 155, as shown in FIG. 3, a larger portion of the light output by the first waveguide is reflected from the inner surface 150 of the channel before entering the second waveguide.

The channels may have regions 165 of increased width and depth. Since the walls of the channel are not in contact with the waveguide section 120 in the regions 165, air pockets are formed around the waveguides 120 in those regions. This reduces losses and increases uniformity of the transmission properties of the waveguides.

Typically, a channel 145 includes two regions 165 separated by a central region 167 having a reduced cross section sized to conform to the cross section of a waveguide 120. Each end of the channel includes an end region 169 having the same cross-section as the central region 167. As such, each waveguide 120 is secured in place by contact with the central region 167 and an end region 169.

Referring again to FIG. 1, the connector 110 serves as an illuminator, i.e., a structure that holds a light source 170 in position and directs light from the source 170 into waveguide inputs. The connector/illuminator 110 has openings 175 and 177 in the top and bottom components 130 and 135 for receiving a light source 170, such as a printed circuit (PC) bulb. The source 170 is positioned in the center of the illuminator 110 so that input ends 125 of the two waveguide sections 120 are held in proximity to the source 170.

If the source 170 is a PC bulb, for example, the base of the PC bulb 170 may be mounted on a platform 180 positioned below the connector/illuminator 110. The bulb 170 is positioned in a hole 185 having slots 187 to accommodate locking tabs 190 on the sides of the PC bulb base. During installation, the PC bulb 170 is inserted into the hole 185 and twisted to lock it in place. The platform 180 is adjustable, so that sources of varying sizes can be optimally positioned within the connector/illuminator 110. In addition, platforms 180 with various sized holes may be provided to accommodate different bulb sizes.

The ends 125 of the waveguide sections 120 are positioned within the connector/illuminator 110 to optimize the amount of light entering the waveguides based on factors such as the surface area and the acceptance angle of the waveguide input ends 125. Other factors, such as heat loading, also may be considered. In alternative configurations, the illuminator may have, for example, three or four outputs, instead of two. For three outputs, the components may be formed in a "Y" shape, with one end of the channel splitting into two channels. For four outputs, the components may be formed in a cross shape and may have a second channel that extends perpendicularly to the first channel. Other configurations to accommodate additional waveguide sections also are contemplated.

In more general terms, an optical waveguide connector has a first component defining a first channel portion formed along a length of an inner surface thereof. The first channel portion is sized to receive a waveguide. A second component defines a second channel portion along a length of an inner surface thereof. The second channel portion also is sized to receive a waveguide. A fastening mechanism fastens the first component to the second component such that the waveguides are held in position. The first and second channel portions form a channel having a reflective inner surface and a central portion. The central portion surrounds and conforms in shape to the waveguides.

The optical waveguide connector may include a first waveguide positioned in a first end of the channel and a second waveguide positioned in a second end of the channel. The first and second waveguides may be held in position by the first and second components. An end face of the first waveguide may face an end face of the second waveguide in the central portion of the channel.

A gap may be formed between the end faces of the first and second waveguides. The gap may allow light output from one of the first and second waveguides to reflect from the inner surface of the channel and enter the other of the first and second waveguides. The channel may have an enlarged portion that forms an air pocket surrounding a waveguide.

Figure 4:
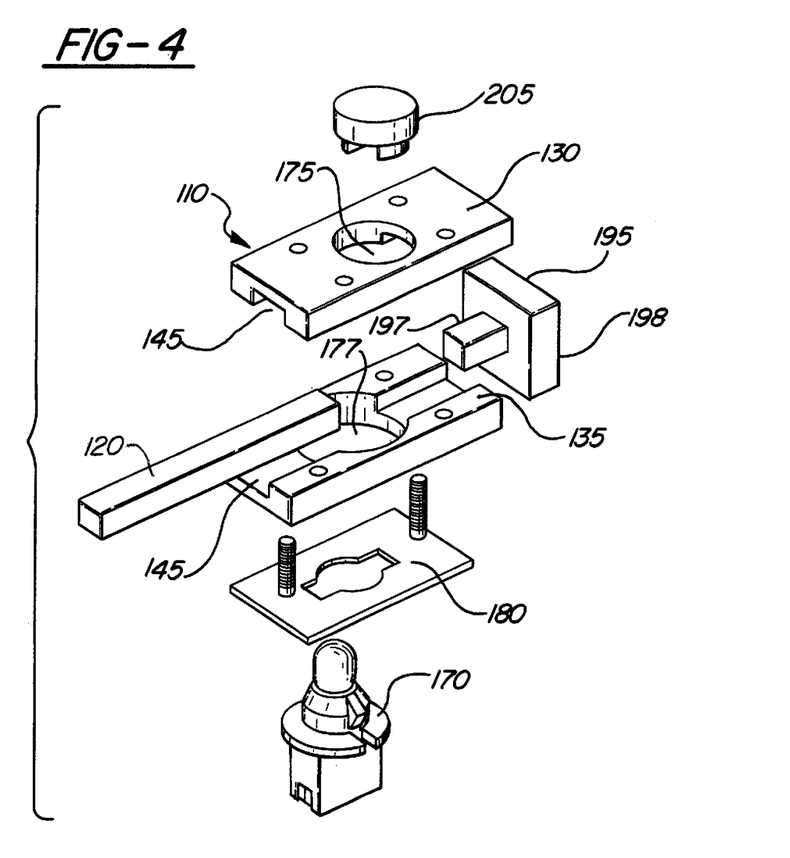
FIG. 4 is an exploded view of a waveguide illuminator having a cap and an end plug.

A single output configuration of the connector/illuminator 110, as shown in FIG. 4, has a top component 130 and a bottom component 135, as described above. A waveguide section 120 is positioned in the channel 145 on one side of the source 170, and an end plug 195 is positioned in the channel 145 on the opposite side of the source 170. The end plug 195 may be formed of metal and may have an inserted portion 197 that is the same size as the waveguide section and an end face 198 that extends from the end of the connector/illuminator 110. Alternatively, the end plug 195 may be formed of light transmitting material and may serve as a light output. The end plug 195 is removable to permit later installation of another waveguide 120.

Figure 5:
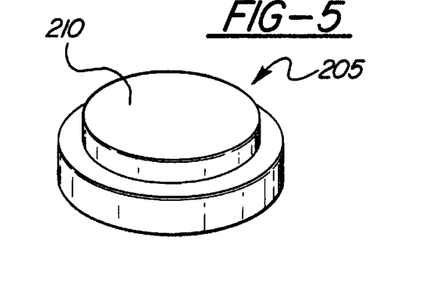
FIGS. 5–7 are perspective views of the underside of a cap for a waveguide illuminator.
Figure 6:
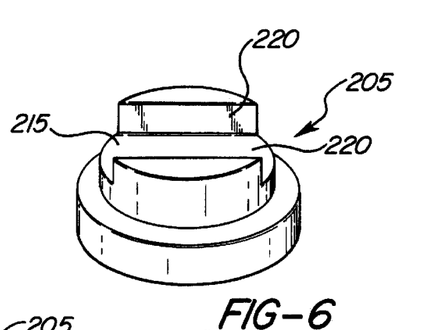

A cap 205 may be positioned in the top opening 175 of the connector/illuminator 110 to reduce light loss. As shown in FIG. 5, the cap 205 may have a flat, reflective interior surface 210. Alternatively, as shown in FIG. 6, a cap channel 215 with reflective inner surfaces 220 may be formed on the interior of the cap 205 to reduce light loss and to help contain light within the waveguides 120. The cap channel 215 may be approximately the same width as the connector channel 145. The cap channel 215 also may function as a light cutoff valve or dimmer by rotating the cap 205 so that the cap channel 215 is not aligned with the connector channel 145. In addition, caps 205 may be placed in both openings 175 and 177 of the connector/illuminator 110 if it is to function as a connector, rather than as an illuminator.

Figure 7:
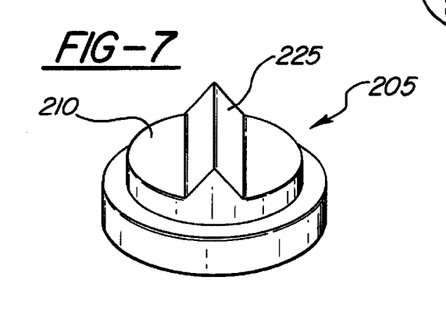
Figures 8, 9:
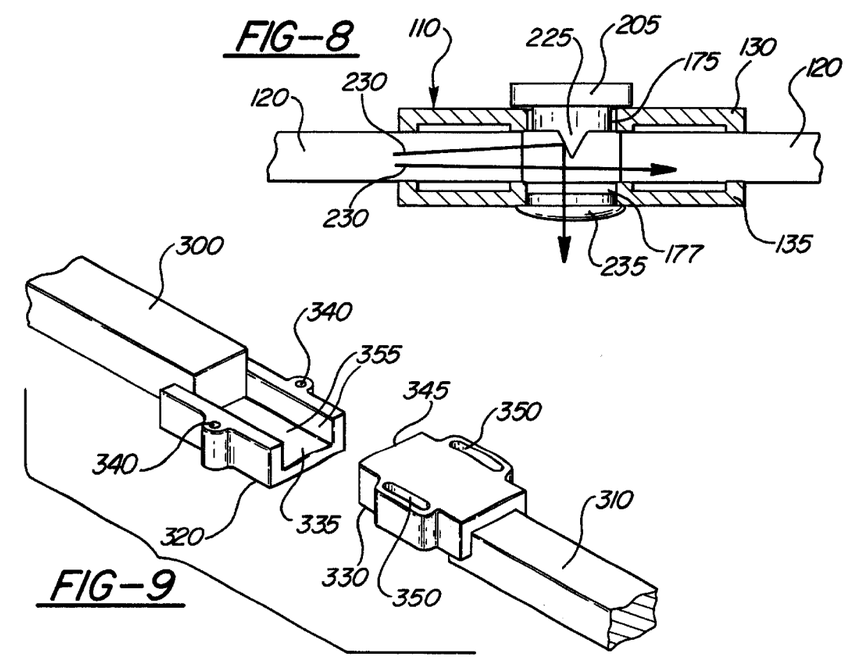
FIG. 8 is a sectional view of a cap with a reflective wedge positioned in a connector/illuminator.
FIG. 9 is a perspective view of a pair of waveguides having integrated connectors.

As shown in FIG. 7, a reflective surface, such as a wedge 225, may extend from the interior surface 210 of the cap 205 to redirect a portion of the light in the connector/illuminator. The cap 205 is positioned in the opening 175, as shown in FIG. 8, with the wedge 225 positioned perpendicular to the connector channel 145. A portion of the light 230 output from a waveguide 120 is reflected from the wedge 225 toward the opposite opening 177. The remaining light enters the waveguide 120 on the opposite side of the connector. An output lens 235 may be positioned in the opposite opening 177 to seal the connector and provide a desired output beam pattern.

In more general terms, a first component may have an opening formed near the central portion of the channel that is sized to receive a light source. The second component may have an opening formed near the central portion of the channel that is sized to receive a light source.

A first cap may be positioned in the opening of the first component. The first cap may have a reflective surface inside the connector. The first cap may define a cap channel inside the connector that has reflective inner surfaces. The first cap may define a wedge that has reflective surfaces.

A lens may be positioned in the opening of the second component. An end plug may be positioned in a first end of the channel. The end plug may be formed of light transmitting material and may output light. A first waveguide may be positioned in a first end of the channel, and a second waveguide may be positioned in a second end of the channel. A second cap may be positioned in the opening of the second component.

An optical waveguide connector may include an adjustable platform extending from a side of the first component opposite the first channel portion. The platform may hold a light source in position in the opening. The adjustable platform may have an opening to receive a base of a printed circuit bulb. The opening may have slots sized to receive locking tabs of the base.

FIG. 9 shows a pair of waveguides 300 and 310 having integrated connector components 320 and 330. In general, integrated connectors may provide significant cost advantages by reducing the number of molds required to form the waveguide and connector components, by simplifying installation, and by reducing the associated parts count.

A lower component 320 is integrally formed at the end of the first waveguide 300. The component 320 has a lower channel 335 that surrounds the lower half of the waveguide 300. The lower component 320 extends beyond the end of the waveguide 300 so that the second waveguide 310 can be positioned in the lower channel 335. Mounting hardware is inserted into holes 340 on the sides of the component 320.

An upper component 330 is integrally formed at the end of the second waveguide 310 and has an upper channel 345 that surrounds the upper half of the second waveguide 310. The upper component 330 extends beyond the end of the second waveguide 310 so that the first waveguide 300 can be positioned in the upper channel 345. The mounting hardware is inserted into slots 350 on the sides of the component 330. The slots 350 allow the upper 330 and lower 320 components to be repositioned laterally to adjust for changes in the relative position of the ends of the two waveguides 300 and 310.

The interior surfaces 355 of the upper channel 345 and lower channel 335 may be aluminized so that light is reflected from the channel surfaces 355 in the gap between the ends of the waveguides 300 and 310, which reduces light loss (see FIGS. 2 and 3). Alternatively, the components 320 and 330 may be manufactured, along with the waveguides 300 and 310, in a "two-shot" injection molding process. Using the two-shot process, the waveguides 300 and 310 may be formed of light transmitting plastic in one step and the components 320 and 330 may be formed of reflective plastic (e.g., white plastic) in another step. This process eliminates the step of applying a reflective coating to the channel surfaces 355.

The integrated connector shown in FIG. 9 also may be used as an illuminator. An opening may be formed in the components 320 and 330 into which a light source is installed in a manner similar to that shown in FIGS. 1 and 4.

In more general terms, a first waveguide may be integrally formed with and partially surrounded by the first component. A second waveguide may be integrally formed with and partially surrounded by the second component. An end face of the first waveguide may face an end face of the second waveguide in the channel.

The first component may have an opening formed near the central portion of the channel and sized to receive a light source. An adjustable platform may extend from a side of the first component opposite the first channel portion. The platform may hold a light source in position in the opening. The adjustable platform may have an opening to receive a base of a printed circuit bulb. The opening may have slots sized to receive locking tabs of the base.

Using a single mold, the first and second components may be formed of reflective plastic while the first and second waveguides are formed of light transmitting plastic.

Fastener holes may be positioned on sides of the first or second component. Fastener slots may be positioned on sides of the first or second component. The fastener slots may be shaped to allow adjustment of a distance between the end faces of the first and second waveguides.

Figure 10:
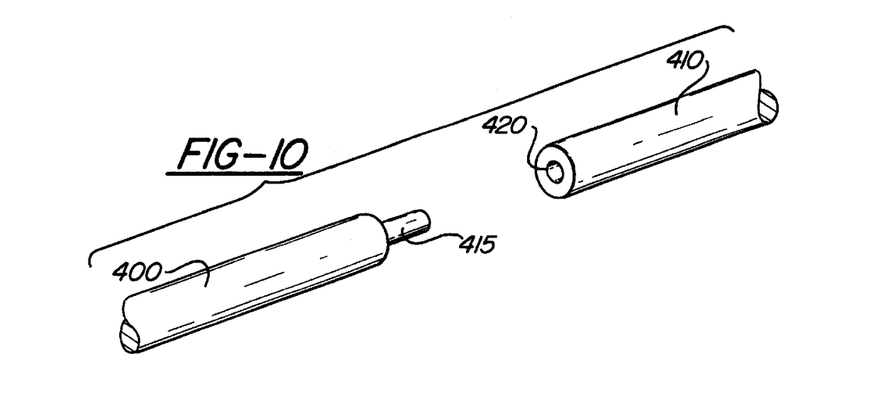
FIG. 10 is a perspective view of a pair of round waveguides having integrated plug and jack connectors.
Figure 11:
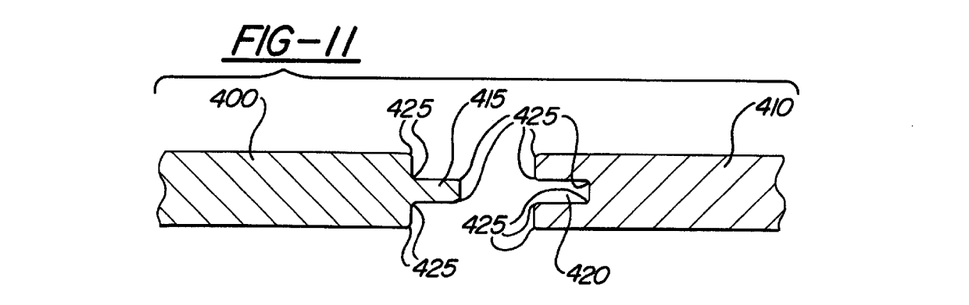
FIG. 11 is a sectional view of a pair of round waveguides having integrated plug and jack connectors.

FIGS. 10 and 11 show a pair of round, 6.0 mm diameter waveguides 400 and 410 having integrated connectors. The end of the first waveguide 400 forms a jack-type connector 415 that is inserted into a hollow portion, or plug-type connector 420, formed in the end of the second waveguide 410. A similar configuration may be used for square waveguides.

In general, a connection between two waveguides may have discontinuities that cause scattering and loss of light. For example, fillets 425 at the ends of the waveguides 400 and 410 may cause light to scatter out of the waveguide or back toward the source instead of entering the target waveguide. In addition, there may be an air gap formed between the ends of the waveguides when they are connected, causing further light loss.

The edges of the connector surfaces shown in FIGS. 10 and 11 have 0.5 mm fillets 425 due to manufacturing and assembly requirements. A computer simulation indicates that this configuration results in a light loss of about 35% compared to a waveguide of similar size and length without a connector. However, such losses may be acceptable or even desirable in applications in which light must be attenuated for a particular output. In addition, for systems requiring redundancy, it may be desirable to have a portion of the light reflected back from the connector so that the light can be directed to other parts of the system.

In more general terms, an integrated optical waveguide connector includes first and second waveguides. The second waveguide has a plug integrally formed at an end thereof. The plug has a hollow portion sized to receive the end of the first waveguide. The end of the first waveguide received by the plug may include a jack having a reduced cross-sectional area relative to a transmission portion of the first waveguide. The first and second waveguides may be round or square.

Figure 12:
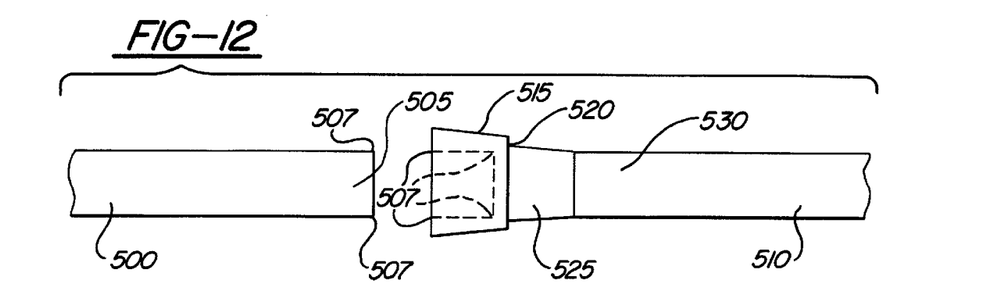
FIGS. 12 and 13 are plan views of pairs of waveguides having integrated plug and jack connectors.

FIG. 12 shows another configuration of the integrated plug and jack connectors. The dimensions of a first waveguide 500 remain constant up to the end portion, which forms a jack connector 505. Fillets 507 may be formed on the edges of the jack connector 505 to make the structure easier to manufacture and assemble. A second waveguide 510 has a plug connector 515 with inner dimensions that are approximately equal to the outer dimensions of the jack connector 505. Fillets 507 also may be formed on the inner and outer edges of the plug connector 515. The waveguides may differ in size. For example, the first waveguide 500 may have smaller dimensions than the second waveguide 510.

The configuration shown in FIG. 12 reduces light loss by positioning the fillets 507 toward the outside edges of the waveguides 500 and 510. In other words, this configuration reduces the ratio of the cross-sectional area of the fillets relative to the total cross-sectional area of the waveguide.

To further reduce light loss, the end portion of the second waveguide 510 widens immediately prior to the plug connector 515. This configuration provides a larger collection area 520 at the end of the second waveguide 510 for receiving light from the first waveguide 500. The collection area 520 then narrows gradually across a narrowing portion 525 to the width of the transmission portion 530 of the waveguide. Light loss also may be reduced by applying index-matched epoxy (i.e., epoxy having an index of refraction nearly equal to that of the waveguide) or similar fluid to the gap between the ends of the waveguides.

Figure 13:
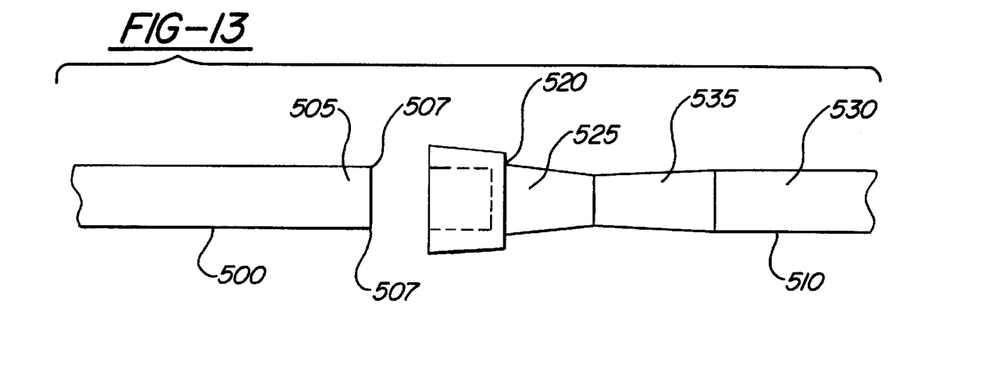
Figures 14, 15:
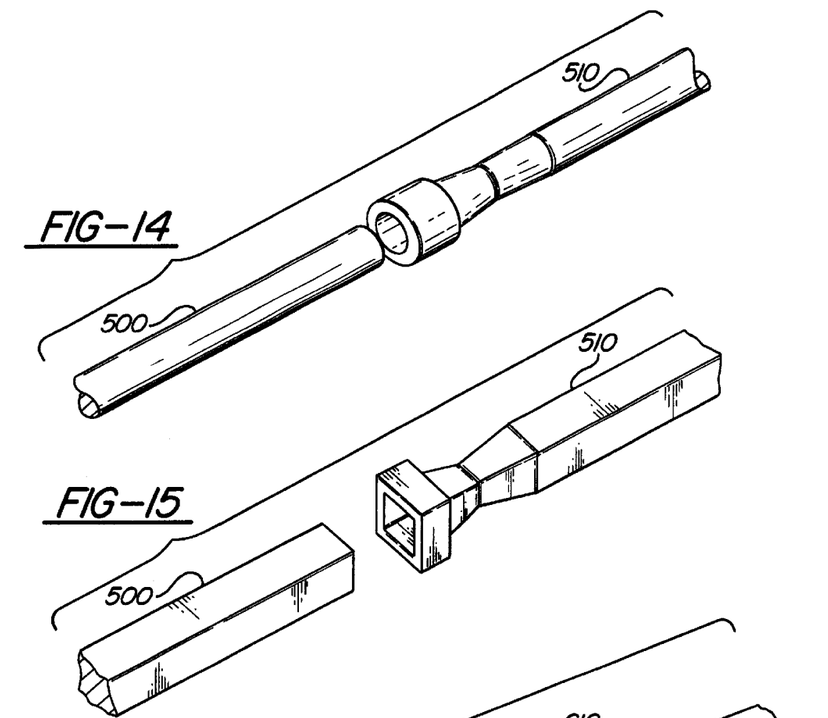
FIG. 14 is a perspective view of a pair of round waveguides having integrated plug and jack connectors.
FIG. 15 is a perspective view of a pair of square waveguides having integrated plug and jack connectors.

The widened collection area 520 and narrowing portion 525 at the end of the second waveguide 510 tend to increase the angular beam spread of the light traveling in the transmission portion 530. To reduce beam spread, the waveguide, as shown in FIG. 13, may have a widening portion 535 following the narrowing portion 525. In this configuration, the waveguide 510 is narrowed in the narrowing portion 525 to a cross-sectional area smaller than that of the transmission portion 530. The waveguide 510 is then widened in the widening portion 535 to have a cross-sectional area equal to that of the transmission portion 530. As shown in FIGS. 14 and 15, the jack and plug integrated connector may be implemented for waveguides having a round (FIG. 14) or square (FIG. 15) cross-section.

In more general terms, the waveguide connector may have a narrowing portion extending from the plug toward a transmission portion of the second waveguide. The cross-sectional area of the narrowing portion at an end nearest the plug may be larger than a cross-sectional area of the transmission portion. The cross-sectional area of the narrowing portion may decrease in a direction toward the transmission portion.

The waveguide connector also may have a widening portion extending from the narrowing portion to the transmission portion. The cross-sectional area of the widening portion at an end of the widening portion nearest the plug may be smaller than the cross-sectional area of the transmission portion. The cross-sectional area of the widening portion may increase in a direction toward the transmission portion.

Figure 16:
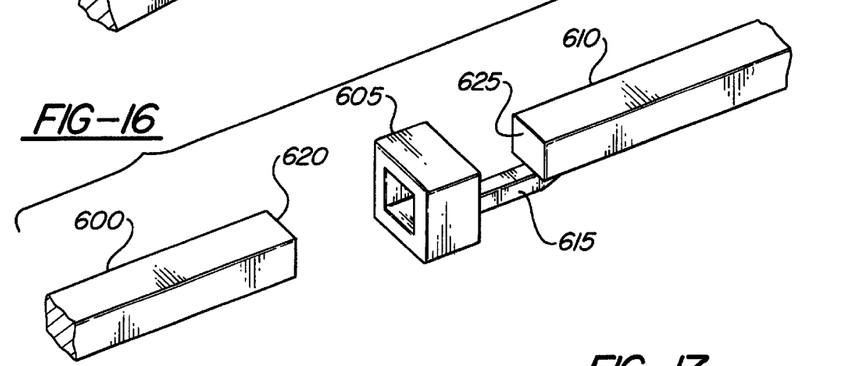
FIG. 16 is a perspective view of a pair of square waveguides having an integrated connector bracket.
Figure 17:
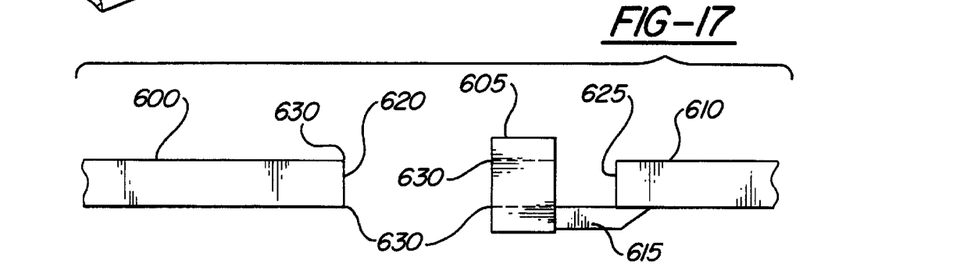
FIG. 17 is a plan view of a pair of square waveguides having an integrated connector bracket.

FIGS. 16 and 17 show an integrated connector configuration in which a first waveguide 600 is inserted into a bracket 605 that is integrally connected to the side of a second waveguide 610 by a bridge 615. The first waveguide 600 is inserted through the bracket 605 until the end face 620 contacts the end face 625 of the second waveguide 610. Fillets or chamfers may be used on leading edges 630 of the bracket and the first waveguide. However, the fillets are formed toward the outer edges of the waveguides, which tends to reduce light loss. In addition, there is no need for a narrowing or tapered portion on the second waveguide 610, which reduces light loss and beam spread.

In more general terms, a waveguide connector may have a plug that includes a bracket integrally attached to the second waveguide with a bridge that extends from a side of the second waveguide. The hollow portion of the connector may be an opening shaped to surround the first waveguide and align an end of the first waveguide with an end of the second waveguide.

Other embodiments are within the scope of the following claims.

What is claimed is:

1. An optical waveguide connector assembly, comprising:
   first and second waveguides,
   a first component defining a first channel portion located along a length of an inner surface thereof, said first channel portion sized to receive said first and second waveguides, and
   a second component defining a second channel portion located along a length of an inner surface thereof, said second channel portion sized to receive said first and second waveguides,
   wherein said first component is attachable to said second component such that said first and second channel portions form a channel having a central portion, with said first and second waveguides each being disposed in both of said first and second channel portions and with said first and second components together surrounding and conforming in shape to said first and second waveguides,
   wherein said first waveguide is positioned in a first end of said channel said second waveguide is positioned in a second end of said channel, and said first and second waveguides are held in position by said first and second components, with an end face of said first waveguide facing an end face of said second waveguide in said central portion of said channel, and
   wherein said channel has a reflective inner surface and wherein a gap is formed between said end faces of said first and second waveguides, said gap allowing light output from one of said first and second waveguides to reflect from said inner surface of said channel and enter the other of said first and second waveguides.

2. The optical waveguide connector assembly of claim 1, wherein said channel has an enlarged portion that forms an air pocket surrounding said first waveguide.

3. The optical waveguide connector assembly of claim 1, further comprising a fastening mechanism which fastens said first component to said second component.

4. An optical waveguide connector assembly, comprising:
   first and second waveguides,
   a first component defining a first channel portion located along a length of an inner surface thereof, said first channel portion sized to receive said first and second waveguides, and
   a second component defining a second channel portion located along a length of an inner surface thereof, said second channel portion sized to receive said first and second waveguides,
   wherein said first component is attachable to said second component such that said first and second channel portions form a channel having a central portion, with said first and second waveguides each being disposed in both of said first and second channel portions and with said first and second components together surrounding and conforming in shape to said first and second waveguides,
   wherein said first component comprises an opening formed near said central portion of said channel, said opening of said first component being sized to receive a light source.

5. The optical waveguide connector assembly of claim 4, wherein said second component comprises an opening formed near said central portion of said channel, said opening of said second component being sized to receive a light source.

6. The optical waveguide connector assembly of claim 4, wherein:
   said first waveguide is positioned in a first end of said channel, and
   said second waveguide is positioned in a second end of said channel.

7. An optical waveguide connector assembly, comprising:
   first and second waveguides,
   a first component defining a first channel portion located along a length of an inner surface thereof, said first channel portion sized to receive said first waveguide, and
   a second component defining a second channel portion located along a length of an inner surface thereof, said second channel portion sized to receive said second waveguide,
   wherein said first component is attachable to said second component such that said first and second channel portions form a channel having a central portion, said central portion surrounding and conforming in shape to said first ad second waveguides,
   wherein said first component comprises an opening formed near said central portion of said channel, said opening of said first component being sized to receive a light source,
   wherein said second component comprises an opening formed near said central portion of said channel, said opening of said second component being sized to receive a light source, and
   wherein said connector assembly further comprises a first cap positioned in said opening of said first component, said first cap having a reflective surface inside said connector assembly.

8. The optical waveguide connector assembly of claim 7, wherein said fist cap defines a cap channel inside said connector assembly, said cap channel having reflective inner surfaces 9. The optical waveguide connector assembly of claim 7, wherein said first cap defines a wedge inside said connector assembly, said wedge having reflective surfaces.

10. The optical waveguide connector assembly of claim 9, further comprising a lens positioned in said opening of said second component.

11. The optical waveguide connector assembly of claim 7, further comprising a second cap positioned in said opening of said second component, said second cap having a reflective surface inside said connector assembly.

12. The optical waveguide connector assembly of claim 11, wherein said second cap defines a cap channel inside said connector assembly, said cap channel having reflective inner surfaces.

13. An optical waveguide connector assembly, comprising:
  a waveguide,
  a first component defining a first camel portion located along a length of an inner surface thereof, said first channel portion sized to receive said waveguide, and
  second component defining a second channel portion located along a length of an inner surface thereof, said second channel portion sized to receive said waveguide,
  wherein said first component is attachable to said second component such that said first and second channel portions form a channel having a central portion, said waveguide extending out of a first end of said channel with said central portion surrounding and conforming in shape to said waveguide,
  wherein said first component comprises an opening formed near said central portion of said channel, said opening of said first component being sized to receive a light source, and
  wherein said connector assembly further comprises an end plug positioned in a second end of said channel.

14. The optical waveguide connector assembly of claim 13, wherein said end plug is formed of light transmitting material and outputs light.

15. The optical waveguide connector assembly of claim 13, wherein said end cap comprises an enlarged end and an inserted portion that is the same size as the second end of said channel.

16. An optical waveguide connector assembly, comprising;
  first and second waveguides,
  a first component defining a first channel portion locked along a length of an inner surface thereof, said first channel portion sized to receive said first waveguide, and
  a second component defining a second channel portion located along a length of an inner surface thereof, said second channel portion sized to receive said second waveguide,
  wherein said first component is attachable to said second component such that said first and second channel portions foil a channel having a central portion, said central portion surrounding and conforming in shape to said first and second waveguides,
  wherein said first component comprises an opening formed near said central portion of said channel, said opening of said first component being sized to receive a light source,
  wherein said second component comprises an opening formed near said central portion of said channel, said opening of said second component being sized to receive a light source, and
  wherein said connector assembly further comprises an adjustable platform extending from a side of said first component opposite said fire channel portion, said platform positioned to hold a light source in position in said opening.

17. The optical waveguide connector assembly of claim 16, wherein said adjustable platform comprises an opening to receive a base of a printed circuit bulb, said opening having slots sized to receive locking tabs of the base.

18. An optical waveguide connector assembly, comprising:
  first and second waveguides,
  a first component defining a first channel portion located along a length of an inner surface thereof, said first channel portion sized to receive said first and second waveguides, and
  a second component defining a second channel portion located along a length of an inner surface thereof, said second channel portion sized to receive said first and second waveguides,
  wherein said first component is attachable to said second component such that said first and second channel portions form a channel having a central portion, with said first and second waveguides each being disposed in both of said first and second channel portions and with said first and second components together surrounding and conforming in shape to said first and second waveguides,
  wherein said first waveguide is integrally formed with and partially surrounded by said first component, said second waveguide is integrally formed with and partially surrounded by said second component, and an end face of said first waveguide faces an end face of said second waveguide in said channel.

19. The optical waveguide connector assembly of claim 18, wherein said first component comprises an opening formed near said central portion of said channel, said opening of said first component being sized to receive a light source.

20. The optical waveguide connector assembly of claim 19, further comprising an adjustable platform extending from a side of said first component opposite said first channel portion, said platform positioned to hold a light source in position in said opening.

21. The optical waveguide connector assembly of claim 20, wherein said adjustable platform comprises an opening to receive a base of a printed circuit bulb, said opening having slots sized to receive locking tabs of the base.

22. The optical waveguide connector assembly of claim 18, wherein, using a single mold, said first and second components are formed of reflective plastic and said first and second waveguides are formed of light transmitting plastic.

23. The optical waveguide connector assembly of claim 18, further comprising:
  fastener holes positioned on sides of said first or second component, and
  fastener slots positioned on sides of said first or second component, said fastener slots shaped to allow adjustment of a distance between said end faces of said first and second waveguides.

* * * * *

UNITED STATES PATENT AND TRADEMARK OFFICE
CERTIFICATE OF CORRECTION

PATENT NO.    : 6,510,267 B1
DATED         : January 21, 2003
INVENTOR(S)   : George R. Hulse and Joe Parton Young It is certified that error appears in the above-identified patent and that said Letters Patent is hereby corrected as shown below:

Column 8,
Line 45, after "said first" delete "ad" and insert therein -- and --.
Line 59, after "wherein said" delete "fist" and insert therein -- first --.
Line 61, insert -- . -- at the end of the claim.

Column 9,
Line 12, after "defining a first" delete "camel" and insert therein -- channel --.
Line 43, after "channel portion" delete "locked" and insert therein -- located --.
Line 53, after "channel portions" delete "foil" and insert therein -- form --.

Signed and Sealed this

Twenty-fourth Day of June, 2003

JAMES E. ROGAN
*Director of the United States Patent and Trademark Office*